(12) United States Patent
Denny et al.

(10) Patent No.: US 7,991,136 B2
(45) Date of Patent: Aug. 2, 2011

(54) METHODS, APPARATUS AND COMPUTER PROGRAM PRODUCTS FOR ALLOWING ACCESS TO IN-PROGRESS CALLS VIA CALLING GROUPS IN A VOICE OVER INTERNET PROTOCOL COMMUNICATION SYSTEM

(75) Inventors: Michael S. Denny, Sharpsburg, GA (US); Sammie Walter Hill, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1430 days.

(21) Appl. No.: 11/254,003

(22) Filed: Oct. 19, 2005

(65) Prior Publication Data

US 2007/0086446 A1   Apr. 19, 2007

(51) Int. Cl.
*H04M 3/42* (2006.01)
*H04L 12/66* (2006.01)

(52) U.S. Cl. ............. 379/202.01; 455/416; 370/352
(58) Field of Classification Search ............ 379/202.01; 370/260, 356, 352; 455/518, 416; 707/104.1
See application file for complete search history.

(56) References Cited

U.S. PATENT DOCUMENTS

| | | | |
|---|---|---|---|
| 7,062,025 B2 * | 6/2006 | Summers et al. | 379/202.01 |
| 7,505,574 B2 * | 3/2009 | O'Brien et al. | 379/202.01 |
| 2002/0118808 A1 * | 8/2002 | Kelleher et al. | 379/202.01 |
| 2003/0153339 A1 * | 8/2003 | Crockett et al. | 455/518 |
| 2005/0213724 A1 * | 9/2005 | O'Brien et al. | 379/202.01 |
| 2006/0059199 A1 * | 3/2006 | Lappalainen et al. | 707/104.1 |
| 2007/0019618 A1 * | 1/2007 | Shaffer et al. | 370/352 |
| 2007/0086436 A1 | 4/2007 | Denny et al. | |
| 2007/0115923 A1 | 5/2007 | Denny et al. | |

* cited by examiner

*Primary Examiner* — Thjuan K Addy

(57) ABSTRACT

A method of providing Voice-Over Internet Protocol (VoIP) communications can be provided by allowing a VoIP phone line included in a calling group of a plurality of VoIP phone lines to connect to an in-progress call between VoIP phone lines included in the calling group.

14 Claims, 11 Drawing Sheets

| GROUP | PRIVILEGE | SECURITY |
|---|---|---|
| LINE 1 | A | X | L |
| LINE 2 | B | Y | M |

US 7,991,136 B2

METHODS, APPARATUS AND COMPUTER PROGRAM PRODUCTS FOR ALLOWING ACCESS TO IN-PROGRESS CALLS VIA CALLING GROUPS IN A VOICE OVER INTERNET PROTOCOL COMMUNICATION SYSTEM

CROSS REFERENCE RELATED APPLICATIONS

This Application is related to and claims the priority of U.S. patent application Ser. No. 11/254,098, filed Oct. 19, 2005, entitled Methods, Apparatus And Computer Program Products for Secondary Routing of Calls In A Voice Over Internet Protocol Communication System, and U.S. patent application Ser. No. 11/254,004, filed Oct. 19, 2005, entitled Methods, Apparatus And Computer Program Products For Allowing Access To Linegroups and Linegroup Functions In A Voice Over Internet Protocol Communication System, the disclosures of which are hereby incorporated herein by reference.

FIELD OF THE INVENTION

The present invention generally relates to the field of telephony, and more particularly to apparatus, methods, and computer program products for testing Voice Over Internet Protocol communication systems.

BACKGROUND

The Internet has become a mainstream network for communicating not just data, such as email and pictures, but also for providing real-time bi-directional voice communications. Voice Over Internet Protocol (VoIP) is an industry standard that has evolved to enable users to place phone calls through the Internet, instead of through the Public Switched Telephone Network (PSTN). A conventional phone or other Consumer Premises Equipment (CPE) may now be connected to the Internet using an interface device that converts analog phone signals to digital signals that can be communicated through the Internet. A phone call may thereby be communicated through the Internet to a VoIP provider, who converts the call back to an analog signal and places the call through the PSTN that is local to the called phone. A user can thereby dial a telephone number in a conventional manner and have the call routed through the Internet, instead of through the PSTN.

It is also known to provide a VoIP terminal as the CPE itself, rather than converting between the VoIP/analog formats. One such VoIP CPE is the Cisco IP Phone 7960, marketed by Cisco Systems, Inc, of San Jose, Calif. These types of CPEs (or phones) may provide some functionality that may not be otherwise provided by PSTN type phones. For example, some VoIP phones support what is sometimes referred to as a "simultaneous ring" function, where phone lines that are "grouped" will all ring in response to an inbound call.

SUMMARY

Embodiments according to the invention can provide methods, apparatus and computer program products for allowing access to in-progress calls via calling groups in a voice over internet protocol communication system. Pursuant to these embodiments, a method of providing Voice-Over Internet Protocol (VoIP) communications can be provided by allowing a VoIP phone line included in a calling group of a plurality of VoIP phone lines to connect to an in-progress call between VoIP phone lines included in the calling group. In some embodiments according to the invention, a method further allows providing in-progress call status information to remaining VoIP phone lines included in the calling group. A request to join the in-progress call is received from VoIP phone line and the VoIP phone line is bridged to the in-progress call.

In some embodiments according to the invention, receiving a request includes receiving the request to join as a monitor so that no audio information is provided from the VoIP phone line to the in-progress call. In some embodiments according to the invention, the method further includes providing status information of bridging to the VoIP phone lines for display.

In some embodiments according to the invention, the method further includes suppressing status information of bridging to the VoIP phone lines to avoid display thereof based on privilege information associated with VoIP phone line. In some embodiments according to the invention, the method further includes allowing the VoIP phone line bridged to the call in-progress to disconnect therefrom while allowing the in-progress call between the VoIP phone lines included in the calling group included to continue.

In some embodiments according to the invention, allowing further includes allowing the VoIP phone line included in the calling group to connect to the in-progress call based on privilege information associated with the VoIP phone line. In some embodiments according to the invention, allowing further includes allowing the VoIP phone line included in the calling group to connect to the in-progress call based on security information and/or privacy information associated with the in-progress call.

In some embodiments according to the invention, allowing further includes allowing the VoIP phone line included in the calling group to connect to the in-progress call based on input by at least one of the VoIP phone lines included in the in-progress call. In some embodiments according to the invention, the input is an acceptance or a denial. In some embodiments according to the invention, the VoIP phone line requesting to join the in-progress call and the VoIP phone lines conducting the in-progress call are at separate customer premises.

In some embodiments according to the invention, allowing further includes providing in-progress call status information associated with an in-progress call between a first VoIP phone line at a first CP and a second VoIP phone line at a second CP included in a calling group to a third VoIP phone line at a third CP included in the calling group. A request to join the in-progress call is received from the third VoIP phone line. The request to join the in-progress call is provided to the first and/or second VoIP phone lines. Input from the first and/or second VoIP phone lines is allowed for determining whether the third VoIP phone line will bridged to the in-progress call. The third VoIP phone line is bridged to the in-progress call if the input from either or both of the first and second VoIP phone lines allows the third VoIP phone line to connect to the in-progress call. The request to join the in-progress call is denied if the input from either or both of the first and second VoIP phone lines denies permission to the third VoIP phone line to connect to the in-progress call

DESCRIPTION OF THE EMBODIMENTS ACCORDING TO THE INVENTION

Figure 1A:
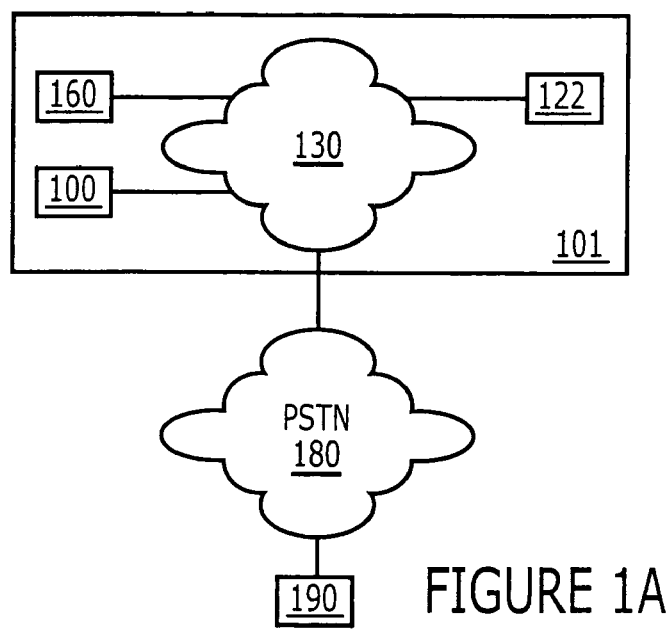
FIG. 1A is a block diagram of a Voice Over Internet Protocol (VoIP) communication system including VoIP Customer Premises Equipment (CPE) that communicates with PSTN communication equipment via a Public Switched Telephone Network (PSTN) according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

The present invention may be embodied as methods, apparatus, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

FIG. 1A is a block diagram of a Voice Over Internet Protocol (VoIP) communication system 101 that includes a VoIP CPE serviced by a VoIP service provider (i.e., service provider) 122 according to various embodiments of the present invention. The VoIP communication system 101 can communicate with PSTN communication equipment 190 via a Public Switched Telephone Network (PSTN) 180 and/or can communicate with other VoIP CPE 160. The VoIP communication system 101 enables phone calls to be initiated and/or received by the VoIP CPEs and/or the PSTN communication equipment 190 via the Internet 130, and such phone calls are sometimes referred to as VoIP phone calls. It will be understood that each of the VoIP CPEs can be assigned to a VoIP phone line. It will be further understood that the Internet 130 referred to herein may be any packet switched data network.

The VoIP CPE 100 may be a computer with a microphone, speaker, and software that is configured to convert voice to/from a digital format that can be routed through the Internet 130. Alternatively, the VoIP CPE 100 may be a conventional telephone that is connected through a VoIP interface device that is configured to convert voice to/from a digital format that can be routed through the Internet 130. The VoIP CPE 100 may be provided by single or dual mode cellular radiotelephone with or without a multi-line display; a Personal Communications System (PCS) terminal that may combine a cellular radiotelephone with data processing, facsimile and data communications capabilities; a Personal Data Assistant (PDA) that can include a mobile terminal, pager, Internet/intranet access, Web browser, organizer, calendar and/or a global positioning system (GPS) receiver; and a conventional laptop and/or palmtop computer.

A subscriber may setup VoIP services by registering with the VoIP service provider 122 and being assigned one or more VoIP telephone numbers. The VoIP service provider 122 can then route phone calls from/to the VoIP phone line(s) assigned to the subscriber based on a called telephone number (e.g., the telephone number to which the phone call is directed). For example, the VoIP service provider 122 may route and establish a phone call from the VoIP CPE 100 through local access internet providers (not shown) and the Internet 130, and through a trunk gateway (also not shown) and the PSTN 180 to the PSTN communication equipment 190. The PSTN communication equipment 190 may be a conventional plain old telephone system (POTS) telephone.

Figure 1B:
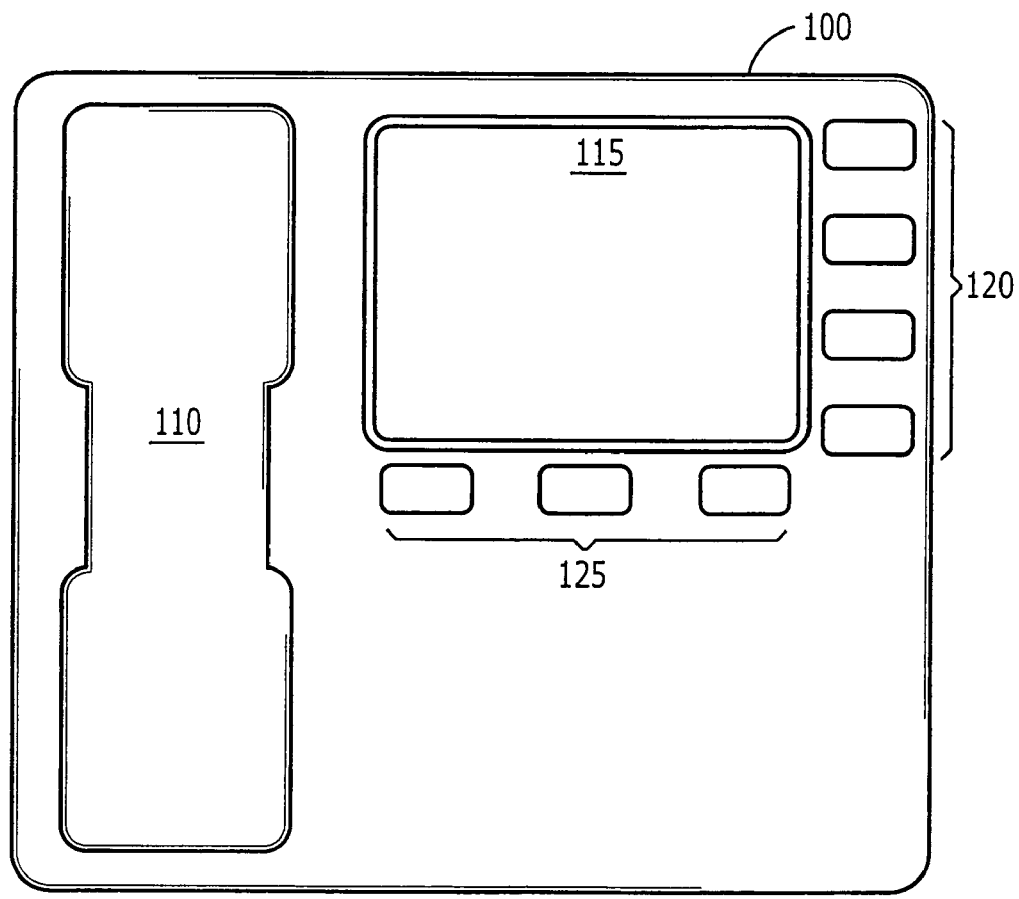
FIG. 1B is a schematic illustration of a VoIP CPE according to some embodiments of the invention.

FIG. 1B is a schematic illustration of the VoIP CPE 100 shown in FIG. 1A according to some embodiments of the invention. In particular, the VoIP CPE 100 includes a display 115 that is capable of displaying indicia of line groups thereon. It will be understood that as used herein the term "line group" refers to a collection of VoIP phone lines that can be logically associated with one another. A line group may be a group of VoIP phone lines that a user of the VoIP CPE 100 associates with one another for either temporary or permanent purposes. For example, in some embodiments according to the invention, a line group can be a group of family or friends VoIP phone lines, a group of c-worker's VoIP phone lines (such as a research and development line group, a marketing line group, a sales line group, etc.), or a social organization line group, etc. Moreover, a VoIP line group can have it's own associated VoIP phone line.

According to FIG. 1B, the display 115 can be configured to allow the display of a plurality of VoIP line groups where at least some of the line groups include a plurality of VoIP phone lines. For example, a line group may be associated with a number of VoIP phone lines that can be provided on the display 115 so that a user may select, via buttons 120, certain ones of the VoIP phone lines. In other words, a user may select certain ones of the VoIP phone lines included in the line group provided on the display and, moreover, may elect not to select other ones of the VoIP phone lines in the line group. In further embodiments according to the invention, one or more operations may be selected to be performed on selected VoIP phone lines included in the line group. For example, buttons 125 may be associated with operations that can be selected once a number of the VoIP phone lines included in the selected line group is provided by input via the buttons 120.

Figure 2:
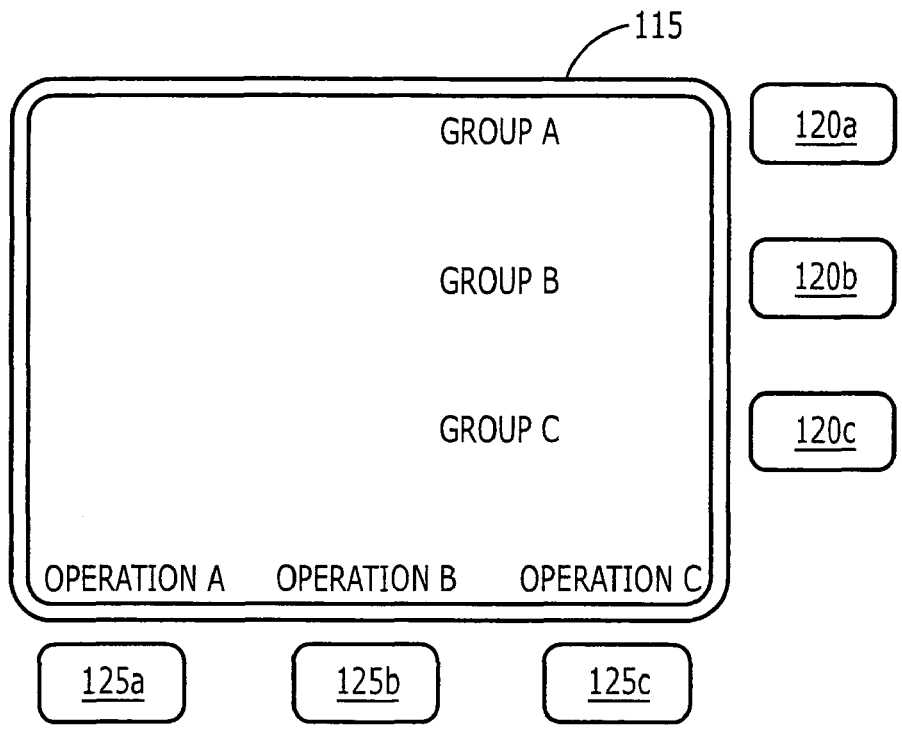
FIG. 2 is a schematic illustration of a display of a VoIP CPE according to some embodiments of the invention.

FIG. 2 is a schematic illustration of the display 115 showing a number of line groups thereon. In particular, the display 115 shows line groups A, B, and C, each having one of the buttons 120 associated therewith. In particular, group A is associated with button 120A; group B is associated with button 120B; and group C is associated with button 120C. In operation, when a user depresses one of the buttons 120A-C, the corresponding line group A-C is selected. It will be understood that although only three line groups are shown, more or fewer line groups can actually be implemented according to other embodiments of the invention.

It will be further understood that the functions associated with each of the buttons 120 can change based on the indicia provided on the display 115. For example, in some embodiments according to the invention, depressing the button 120A selects line group A whereas in other embodiments according to the invention, depressing the same button 120A may select a particular VoIP phone line included within line group A as described hereinbelow in greater detail.

Figure 3A:
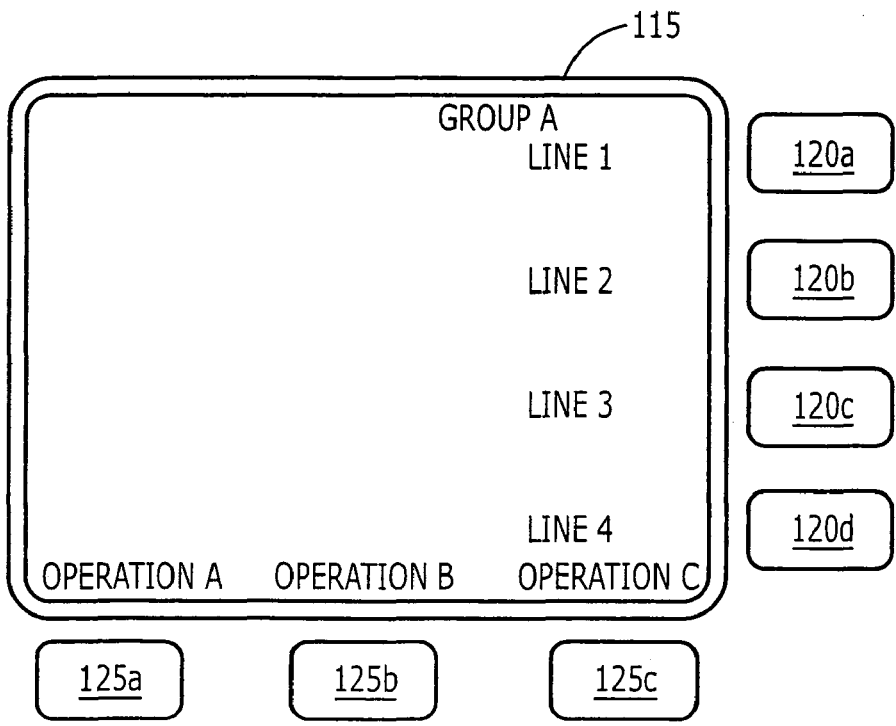
FIG. 3A is a schematic illustration of a display of a VoIP CPE according to some embodiments of the invention.

FIG. 3A is a schematic illustration of the display 115 showing a number of VoIP phone lines included in line group A in some exemplary embodiments according to the invention. In particular, the display 115 illustrates an exemplary view in response to selection of line Group A using button 120A in FIG. 2. In response, the display 115 is updated to provide indicia of the line group A and the VoIP phone lines 1-4 included therein. As described above, the VoIP phone lines can be a logical grouping of phone lines, such as a social organization, a family group, a work-related group, or other groups of related VoIP phone lines. Each of the VoIP phone lines 1-4 is associated with one of the buttons 120A-D shown to the right of the display 115. Any of the VoIP phone lines 1-4 can be selected by providing input via the associated button 120A-D. For example, VoIP phone lines 1 and 3 can be selected by depressing buttons 120A and 120C.

Once the VoIP phone lines are selected, an operation to be associated therewith can be selected using buttons 125A-B shown at the bottom of the display 115. Furthermore, each of the buttons 125A-B has an action associated therewith. Accordingly, when a number of VoIP phone lines included in the line group A have been selected, operations A and/or B can be selected to be performed on the selected VoIP phone lines. In other words, one or more operations can be performed on the selected VoIP phone lines. For example, if VoIP phone lines 1 and 3 are selected, both operations A and B can be performed on the VoIP phone lines 1 and 3. It will be understood that the operations associated with the buttons 125A and B can be, for example, commands to connect to the selected VoIP phone lines, disconnect from the selected VoIP phone lines, and/or other types of common communication operations.

It will be further understood that the indicia associated with the buttons 125A-B can be changed in response to the VoIP phone lines that are selected. For example, in some embodiments according to the invention, not all operations may be allowed for all VoIP phone lines. Accordingly, if a relatively large number of operations is allowed to be performed on the selected VoIP phone lines, more operations may be provided on the display 115. Alternatively, if fewer operations to the selected VoIP phone lines are allowed, fewer options may be made available on the display 115. In some embodiments according to the invention, the operations allowed can depend on the privileges of the VoIP phone line associated with the VoIP CPE 100 and/or with the selected VoIP phone lines.

Figure 3B:
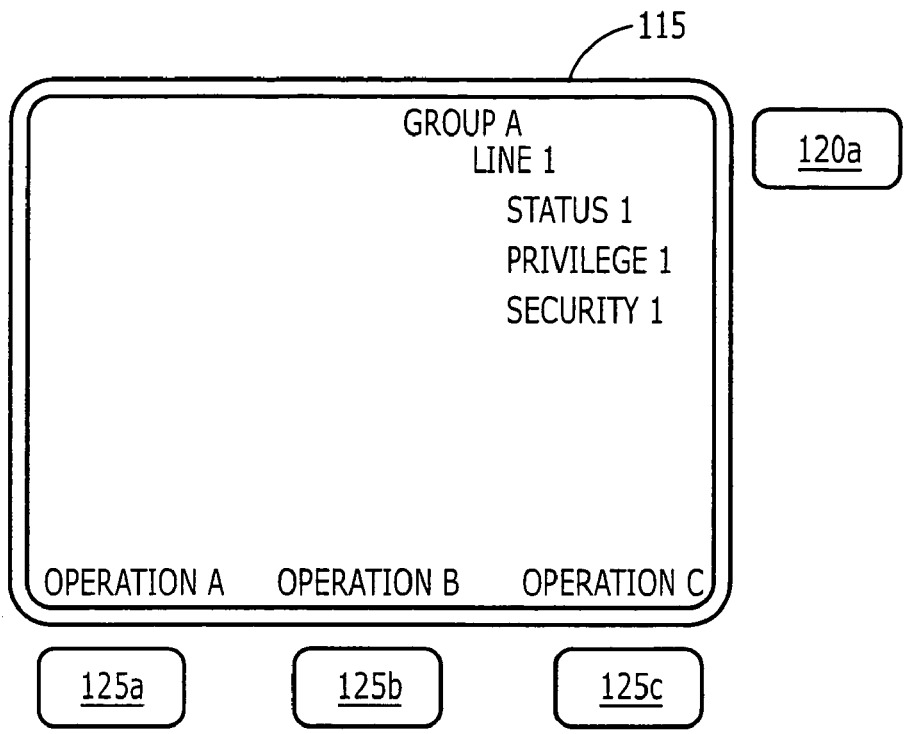
FIG. 3B is a schematic illustration showing additional detail of a VoIP CPE according to some embodiments of the invention.

FIG. 3B is a schematic illustration of the display 115 showing VoIP line 1 and status information associated therewith. In particular, status information provided on the display 115 is associated with the respective VoIP phone line. The status information can include, for example, the status of the VoIP phone line such as "out of office," "on the phone," "do not disturb," or privileged information that indicates, for example, the type of operations that can be performed by users associated with the respective VoIP phone line. The status information can further include security information that indicates how secure the communications channel provided by the VoIP phone line 1 is. The security information can further include, for example, a security clearance associated with the user of VoIP phone line 1.

In operation, it will be understood that the status information may be provided for each of the VoIP phone lines included in the line group A, and further, the status information may be different for each of the VoIP phone lines. In still other embodiments according to the invention, some VoIP phone lines included in the line group A may not be shown on the display 115 (i.e., suppressed). For example, some VoIP phone lines included in the line group A may be those associated with managers or supervisors which may monitor communications among the VoIP phone lines included in the line group A discreetly. Accordingly, the status information associated with such suppressed VoIP phone lines may not be displayed.

Figure 4:
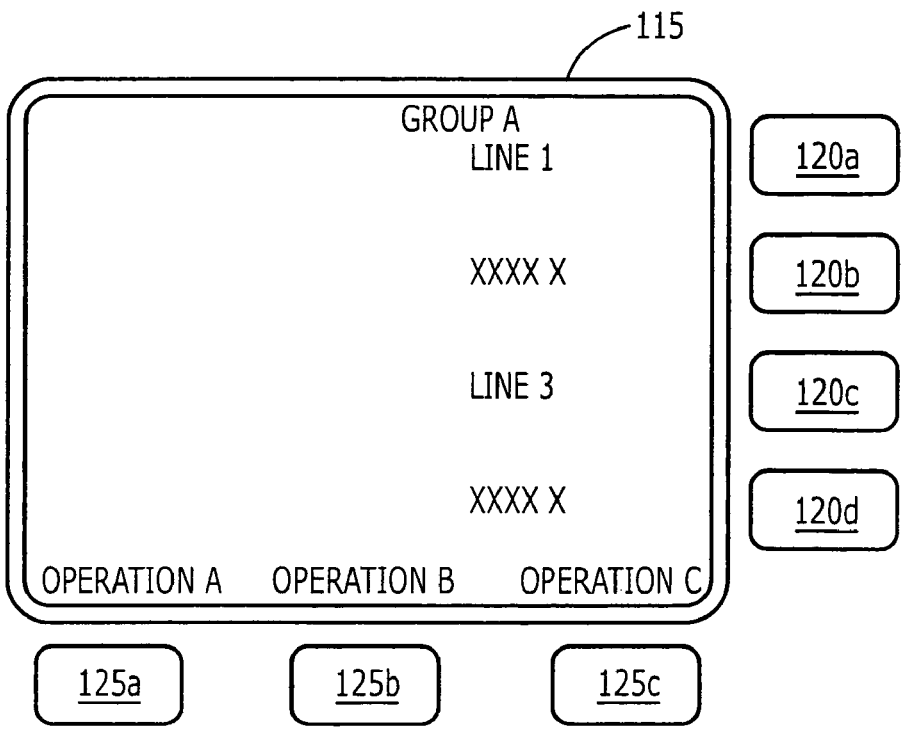
FIG. 4 is a schematic illustration of a display of a VoIP CPE according to some embodiments of the invention.

FIG. 4 is a schematic illustration of the display 115 showing line group A where VoIP phone lines 1 and 3 have been selected whereas VoIP phone lines 2 and 4 (shown in FIG. 3A) have not been selected. In particular, the display of indicia associated with the VoIP phone lines 2 and 4 may be suppressed from the display 115 in response to the nonselection of these VoIP phone lines. Accordingly, the buttons 120B and 120D formerly associated with the VoIP phone lines 2 and 4 may be made available for other uses. Furthermore, as described above, the operations A and B associated with buttons 125A and 125B may be modified once the selection of VoIP phone lines 1 and 3 is complete, for example, to reflect the status of VoIP phone lines 1 and 3.

Figures 5A, 5B:
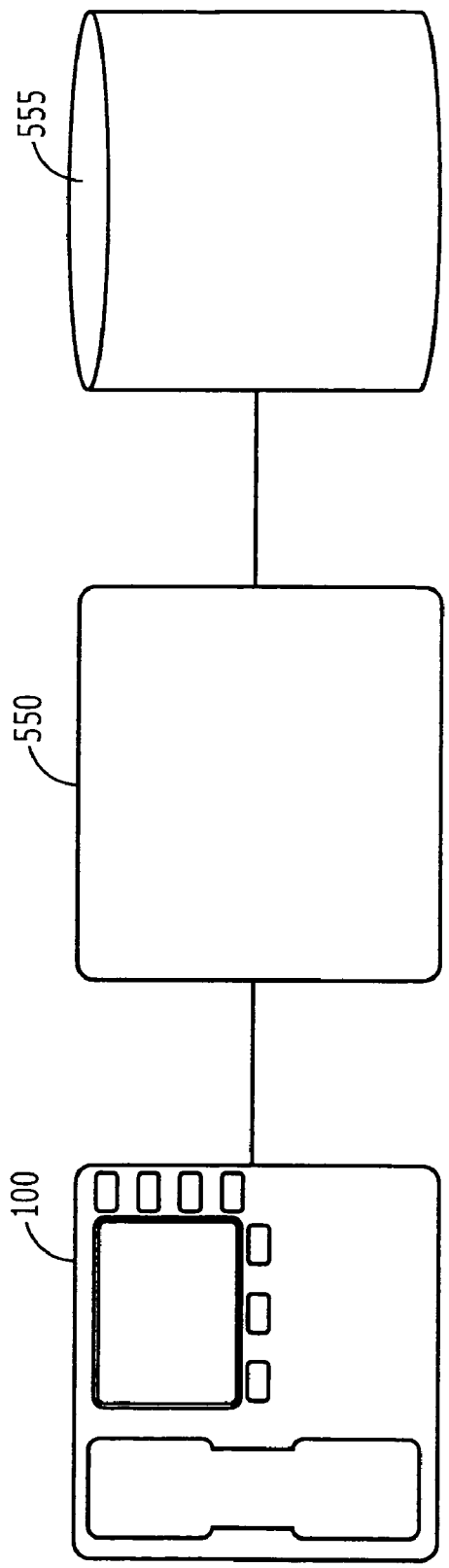
FIG. 5A is a block diagram of a system that provides service according to some embodiments of the invention.
FIG. 5B is a table illustrating VoIP phone lines and associated information in a database according to some embodiments of the invention.

FIG. 5A is a block diagram of a service provider 550 that can provide the line group information from a database 555 to the VoIP CPE 100 in some embodiments according to the invention. In particular, the service provider 550 may provide the services described herein in much the same way that other services are provided in the VoIP environment. In operation, the service provider 550 can access the database 555 to retrieve the line groups therefrom, which can be provided to the VoIP CPE 100. Furthermore, the service provider 550 can respond to input provided via the VoIP CPE 100 to perform selected operations thereon.

Figure 6:
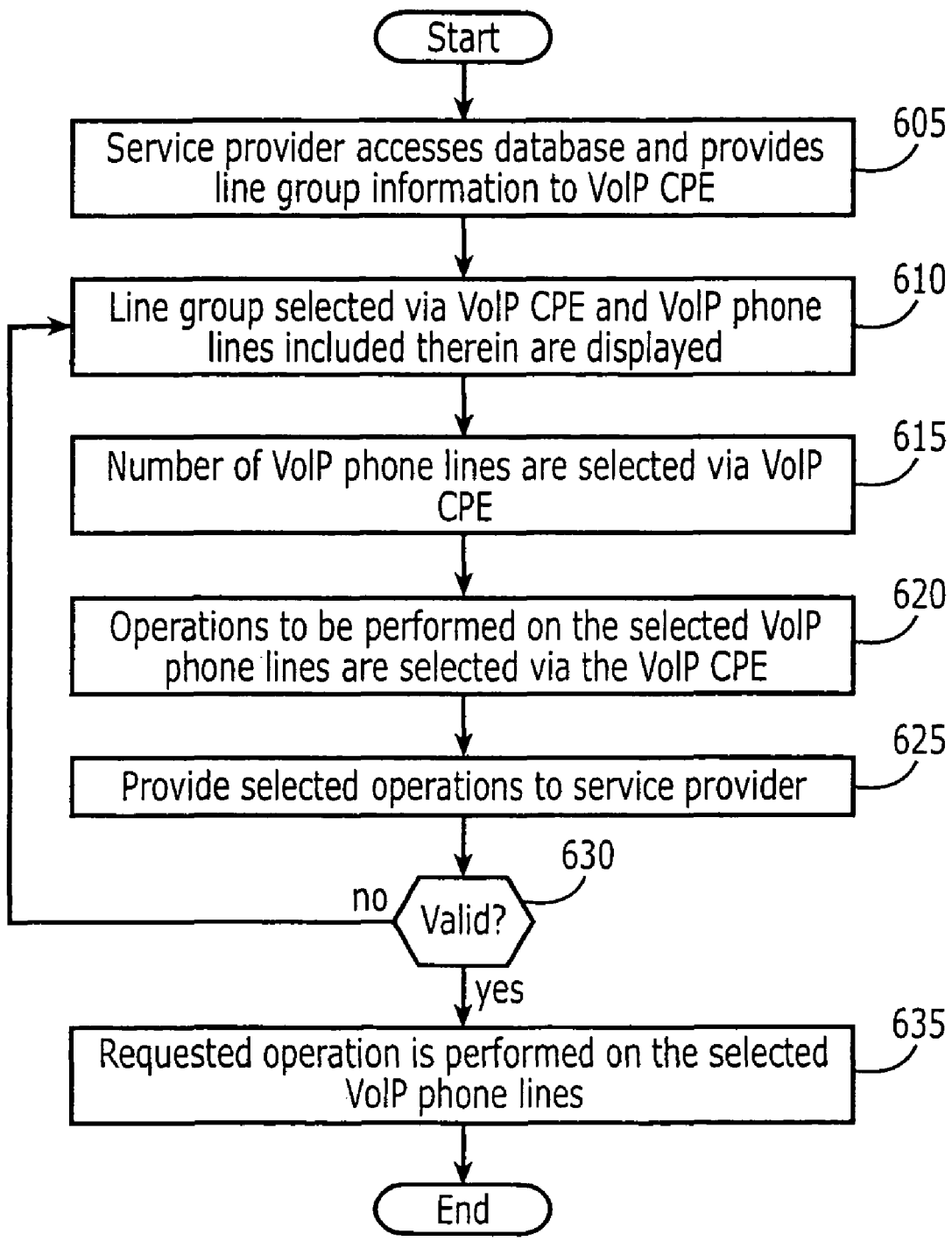
FIG. 6 is a flowchart that illustrates operations of VoIP CPEs according to some embodiments of the invention.

For example, in operations according to some embodiments of the invention as illustrated in FIG. 6, the service provider 550 can access the database 555 and provide line group information to the VoIP CPE 100 (block 605). One of the line groups provided to the VoIP CPE 100 can be selected (block 610), whereupon the VoIP phone lines included in the selected line group are displayed on the VoIP CPE 100. It will be understood that in some embodiments according to the invention, the VoIP phone lines displayed on the VoIP CPE 100 can be transmitted by the service provider 550 along with the line group information (block 605). In other embodiments according to the invention, the VoIP CPE 100 transmits a request to the service provider 550 in response to the selection of the line group, whereupon the service provider 550 accesses the database 555 and returns a list of VoIP phone lines included in the selected line group.

A number of VoIP phone lines provided on the display of the VoIP CPE 100 can be selected (block 615) along with selected operations to be performed thereon (block 620). The requested operations are provided to the service provider 550 (block 625) to determine whether the requested operations are valid in view of the selected VoIP phone lines (block 630). If the selected operations are invalid (block 630), the VoIP CPE 100 informs the user of the invalid request and prompts the user for new input (block 610). If the requested operations are valid (block 630), the requested operation is performed on the selected VoIP phone lines (block 635).

As shown in FIG. 5B, in some embodiments according to the invention, individual VoIP phone lines can be included in multiple line groups. For example, as shown in FIG. 5B, VoIP line 1 is included in both line group A and line group B. Furthermore, a particular VoIP phone line can have status information for each of the line groups in which it is included. Furthermore, the status information associated with a particular VoIP phone line can be different in each group. For example, as shown in FIG. 5B, privileged information associated with VoIP phone line 1 in group A is X, whereas privileged information for the same VoIP phone line 1 as part of group B is Y. Similar characteristics can be associated with other types of status information associated with the VoIP phone lines (such as security information).

Accordingly, certain operations requested to be performed on some of the VoIP phone lines may be valid whereas other requested operations may be invalid. For example, if the security clearance associated with the VoIP CPE 100 is relatively high, an operation to connect to another VoIP CPE having an unacceptably low security clearance may be invalid. In further embodiments according to the invention, VoIP phone lines having relatively high level privileges may have a wider range of valid operations available, whereas VoIP phone lines having relatively low level privileges may have fewer operations available.

It will be further understood that the VoIP phone lines in the database 555 may be designated as to be preconfigured to particular VoIP CPEs. For example, when the VoIP CPE 100 is detected as being powered on, the service provider 550 may spontaneously upload line group information and VoIP phone line information to the VoIP CPE 100 before operations begin. Accordingly, the VoIP CPE 100 may have necessary information required to begin operation once the power-up sequence is complete. Furthermore, the service provider 550 may periodically modify the configuration of the VoIP CPE 100 so that subsequent power-up sequences may result in the VoIP CPE 100 being loaded with updated configuration information such as new line groups and/or new VoIP phone lines included therewith.

Figure 7:
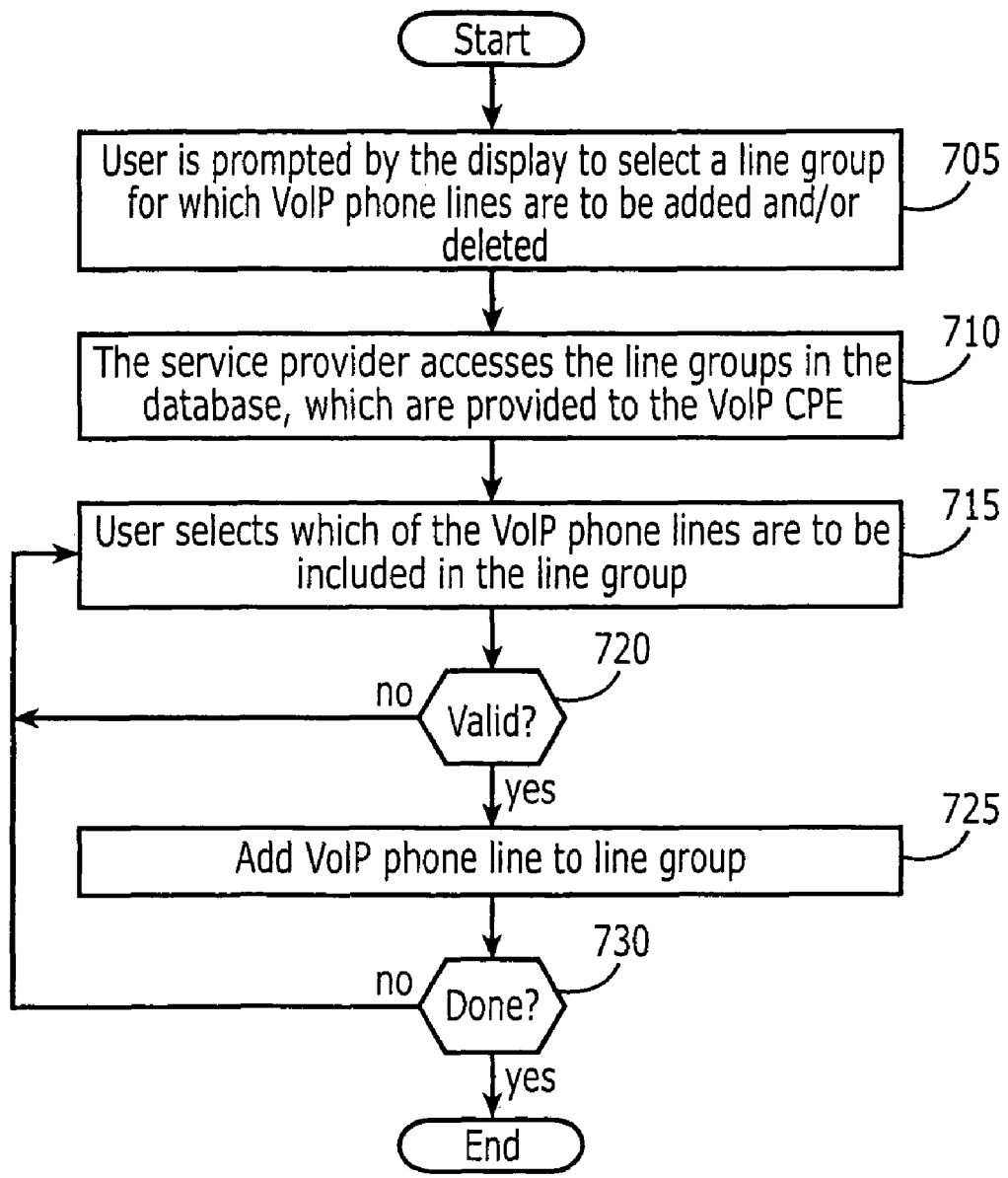
FIG. 7 is a flowchart that illustrates operations of a service provider to a VoIP CPE according to some embodiments of the invention.

FIG. 7 is a flowchart illustrating operations of VoIP CPEs 100 to select line groups in VoIP phone lines for configuration thereof. In particular, the service provider 550 may provide the configuration application to the VoIP CPE 100 which may prompt a user for input via an interface including the display 105 thereon. Referring to FIG. 7, the user is prompted by the display to select a line group for which VoIP phone lines are to be added and/or deleted (block 705). It will be understood that the service provider 550 may provide the configuration application to VoIP CPEs 100, which have sufficient privileges associated therewith to enable the modification of existing line groups and/or the creation of entirely new line groups. For example, in addition to prompting the user for the input of an existing line group, the user may also enter an identification of what is to be a new line group to be added to the database 555 for subsequent use by the VoIP CPE 100 and other CPEs.

The service provider accesses the line groups in the database, which are provided to the VoIP CPE 100 (block 710). The user can select which of the VoIP phone lines are to be included in the line group (block 715). The service provider 550 determines if the VoIP phone lines provided by the VoIP CPE 100 are valid (i.e. registered in the database) (block 720). If any of the VoIP phone lines are invalid (block 720), the service provider 550 does not update the database 555 and informs the VoIP CPE 100 that the requested VoIP phone line is invalid, whereupon a new VoIP phone line may be entered (block 715). If all of the VoIP phone lines are valid (block 720), the selected VoIP phone lines are added to the database 555 by the service provider 550 (block 725). The VoIP CPE 100 may prompt the user for whether additional VoIP phone lines should be added to the line group (block 730).

In still further embodiments according to the invention, a VoIP phone line that is included in a calling group of VoIP phone lines may be allowed to connect to an in-progress call between the VoIP phone lines that are included in the calling group. For example, in some embodiments according to the invention, if a call is currently in-progress between two VoIP phone lines that are included in a calling group, a third VoIP phone line included in the calling group may be allowed to join the in-progress call in a similar fashion to that provided by an extension telephone in a plain old telephone system (POTS). As used herein the term "calling group" includes VoIP phone lines that receive service from the service provider that enables calls between group members to be bridged or joined together.

Each of the VoIP phone lines included in the calling group can further receive information regarding the status of the in-progress call between members of the calling group. The members receiving this status information may request to join the in-progress call (or alternatively request to disconnect from the in-progress call). It will be understood that whether a requesting member of the calling group is allowed to join an in-progress call may depend on the privileges associated with the requesting member as well as security information and/or privacy information associated with the in-progress call. In some embodiments according to the invention, some members of the calling group may have privileges such that they may join or disconnect from the in-progress call without the knowledge of the calling group members participating in the in-progress call. For example, the status information indicating whether a certain member has joined or disconnected from an in-progress call can be suppressed from being displayed to other members of the calling group.

Figure 8A:
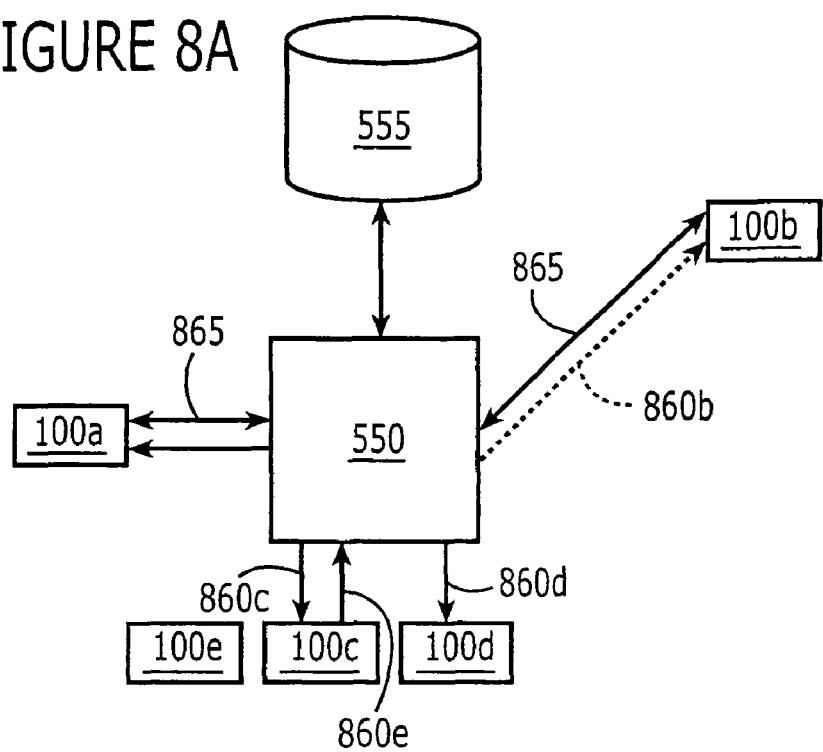
FIGS. 8A-C are schematic illustrations showing services provided to VoIP CPEs according to some embodiments of the invention.
Figure 8B:
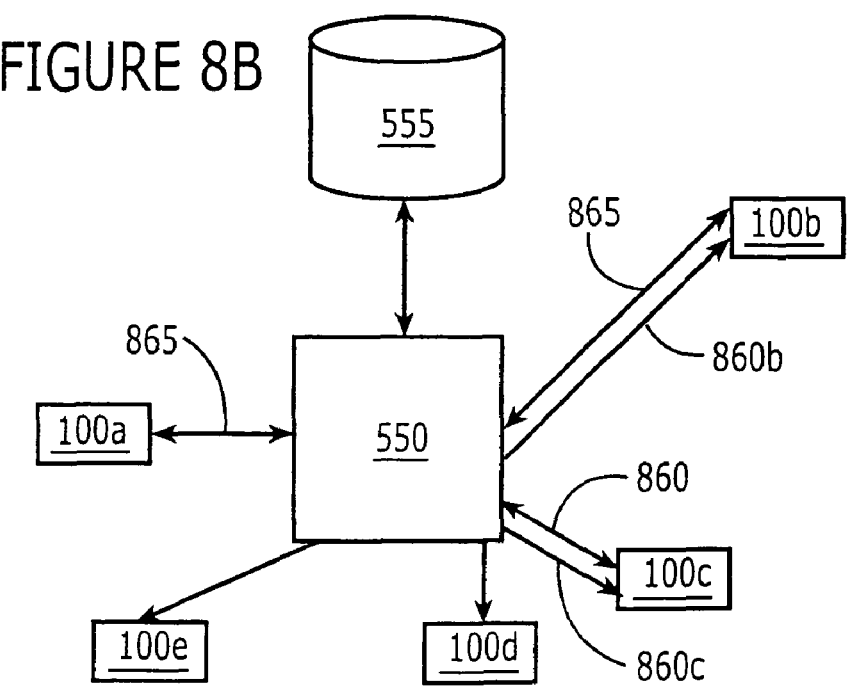
Figure 8C:
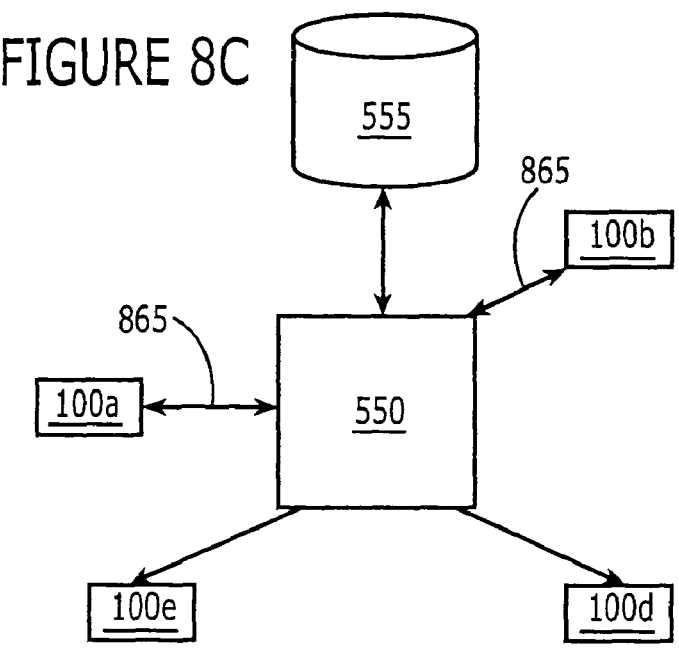

FIGS. 8A-C are schematic illustrations that represent operations of VoIP calling group members supported by in-progress call services according to some embodiments of the invention. In particular, as shown in FIG. 8A, an in-progress call 865 is established between a first VoIP phone line associated with CPE 100A and a second VoIP phone line associated with a second CPE 100B which is monitored by the service provider 550. The database 555 includes lists of VoIP phone lines included in particular calling groups so that the service provider 550 may allow calling group members to join or disconnect from in-progress calls between other members of the same calling group. Status information 860A and 860B is respectively provided to CPE 100A and 100B to reflect the in-progress status of the call 865. Furthermore, status information indicating that the call 865 is in-progress is provided to CPE 100C-E.

According to FIGS. 8A-C, CPE 100D is associated with a VoIP phone line having relatively high privileges, such as those that would be associated with the supervisor or manager of an organization. Furthermore, the CPE 100E may be associated with a VoIP phone line having a relatively low level of privileges compared to that of CPE 100D. The different privileges associated with the different VoIP phone lines may result in some request to join an in-progress call being allowed while other requests to join the in-progress call are denied.

Referring to FIG. 8A, the CPE 100C provides a request 870E to the service provider 550 to join the in-progress call 865. The service provider 550 accesses the database 555 to determine whether the VoIP phone line associated with CPE 100C is included in the calling group that includes the VoIP phone lines already participating in the in-progress call 865. If the service provider 550 determines that the VoIP phone line associated with CPE 100C is included in the calling group, the request to join the in-progress call 865 may be allowed if, for example, the privileged information associated with the VoIP phone line associated with CPE 100C is sufficiently high. For example, in some embodiments according to the invention, the in-progress call 865 may have security or privacy information associated therewith such that the VoIP phone line requesting to join the in-progress call 865 may be required to have sufficiently high privileges to be allowed the in-progress call 865. Otherwise, the request to join the in-progress call 865 may be denied.

If the VoIP phone line associated with the CPE 100C is allowed to join the in-progress call 865, updated status information is provided to each of the members of the calling group including those previously participating in the in-progress call 865. In particular, as shown in FIG. 8A, status information reflecting the fact that CPE 100C has joined the in-progress call 865 can be provided to CPE 100D even though CPE 100D has not currently joined the in-progress call as shown in FIG. 8B. Furthermore, it will be understood that even though the CPE 100D has not joined the in-progress call 865, the status information may be provided thereto. For example, in some embodiments according to the invention, the VoIP phone line associated with the CPE 100D may have relatively high privileges, for example, associated with a supervisor or manager of the calling group. Furthermore, the VoIP phone line associated with the CPE 100D may receive audio of the in-progress call 865 to monitor communications among the calling group but may not join the VoIP phone line associated with the CPE 100D to the in-progress call so as to prevent alerting the calling group members that the supervisor is monitoring the in-progress call 865, such as when a supervisor may wish to monitor calls for training purposes or for quality assurance purposes.

As shown in FIG. 8C, the VoIP phone line associated with the CPE 100C provides a request to the service provider 550 to disconnect from the in-progress call 865. Accordingly, the VoIP phone line associated with the CPE 100C is no longer bridged to the in-progress call 865 and updated status information is provided to the remaining participants of the in-progress call to reflect that the VoIP phone line associated with the CPE 100C is no longer a participant.

Figure 10:
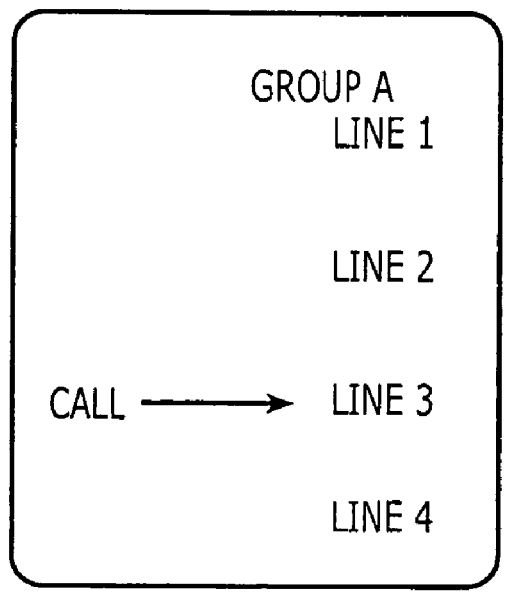
FIG. 10 is a table illustrating a calling group including a plurality of phone lines according to some embodiments of the invention.

In still further embodiments according to the invention, a call placed to a VoIP phone line can be processed based on whether the VoIP phone line called is included in a calling group. For example, as shown in FIG. 10, the calling group A includes a plurality of VoIP phone lines (e.g., lines 1-3 . . . ) that are logically associated with one another. In operation, if a call is placed to a member of the calling group A (for example, line 3) which is determined to be unavailable, the call can be rerouted to other members of the calling group A based, for example, on input provided via the VoIP phone line from which the call is made. For example, in some embodiments according to the invention, if a call is placed to line 3 of calling group A, which is determined to be unavailable, the VoIP phone lines associated with the other members of the calling group A may be provided to the caller. The caller may select one of the other VoIP phone lines so that the call may be rerouted to the selected line.

As discussed herein in greater detail, the options for rerouting of the call may be provided to the caller via information in contact profiles that are associated with either the calling group or individual phone lines within the calling group. Furthermore, in some embodiments according to the invention, there may be multiple contact profiles for each phone line and/or calling group. In still further embodiments according to the invention, the information in the contact profile that is provided to the caller can be selected based on the caller's VoIP phone line (i.e., the caller VoIP phone line) and/or the calling group in which the caller VoIP phone line is a member.

Figure 9:
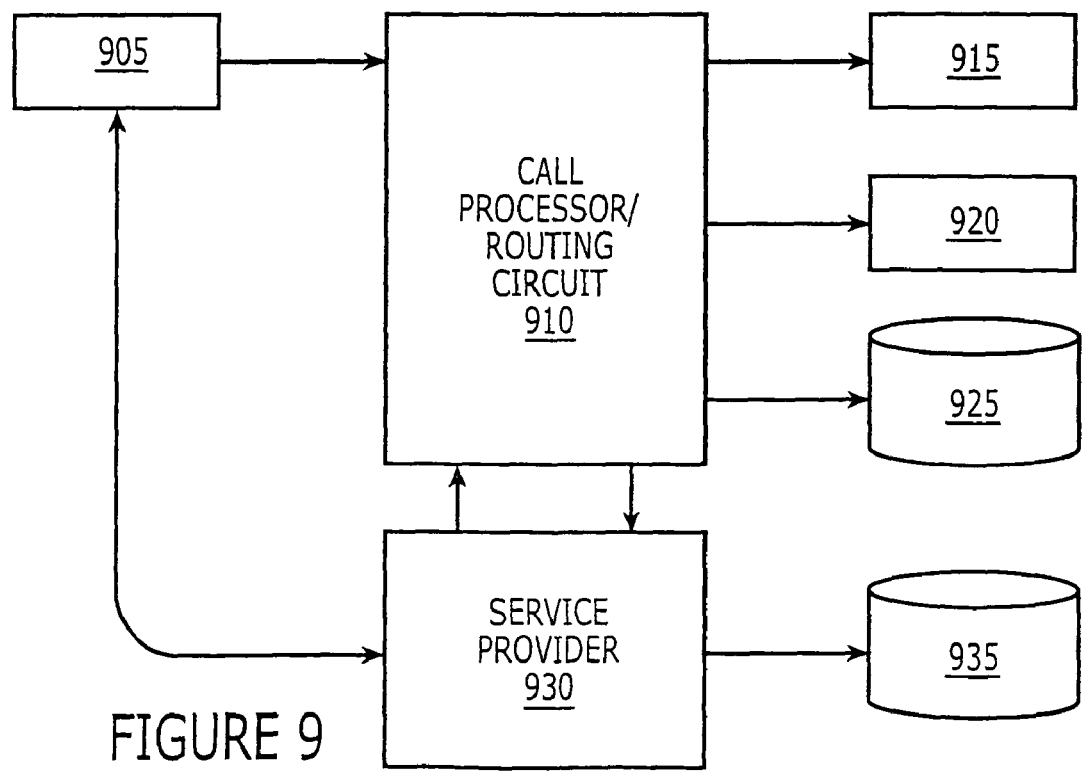
FIG. 9 is a block diagram that illustrates embodiments of call processing/routing system according to some embodiments of the invention.

FIG. 9 is a block diagram that illustrates a call processing/routing system 900 according to some embodiments of the invention. According to FIG. 9, calls can be initiated by a caller VoIP phone line 905 to a primary VoIP phone line 915 and/or a secondary VoIP phone line 920. The VoIP phone lines 905, 915, and 920 can be utilized with VoIP phones or other Customer Premises Equipment which enables input to select secondary VoIP phone lines provided thereto from contact profiles.

The VoIP phone lines 915 and 920 can be VoIP phone lines which are registered subscribers of the system 900 included in a calling group. A call processing/routing circuit 910 routes a call from the caller VoIP phone line 905 to the primary CPE 915. A subscriber database 925 stores a list of subscribers to the system 900 including which calling groups each of the subscribers may be included within. For example, the subscriber database 925 can store information indicating the calling groups in which the primary VoIP phone line 915 and the secondary VoIP phone line 920 are included. Furthermore, if the caller VoIP phone line 905 is a subscriber to the system 900, the subscriber database 925 can store the calling groups to which the caller VoIP phone line 905 belongs.

A service provider 930 can access a contact profile database 935 to determine, for example, whether a call from the caller VoIP phone line 905 can be rerouted to the secondary VoIP phone line 920 if the primary VoIP phone line is unavailable. It will be understood that a subscriber VoIP phone line can have one or more contact profiles which can be invoked based, for example, on the status of the called VoIP phone line, the time of the call, the day of the call, etc. Furthermore, a phone line associated with the calling group in which the called VoIP phone line is a member, can also have a contact profile which may be the same for each of the members included in the calling group.

The service provider 930 can provide the information included in the contact profile to the caller VoIP phone line 905 so that an option for secondary routing of a call may be selected. Once the caller selects an option for re-routing of the call (according to the provided information from the contact profile), the service provider 930 can pass the information specifying the re-routing of the call to the call processing/routing circuit 910, which can re-route the call from the caller VoIP phone line 905 to, for example, the secondary VoIP phone line 920.

Figure 11A:
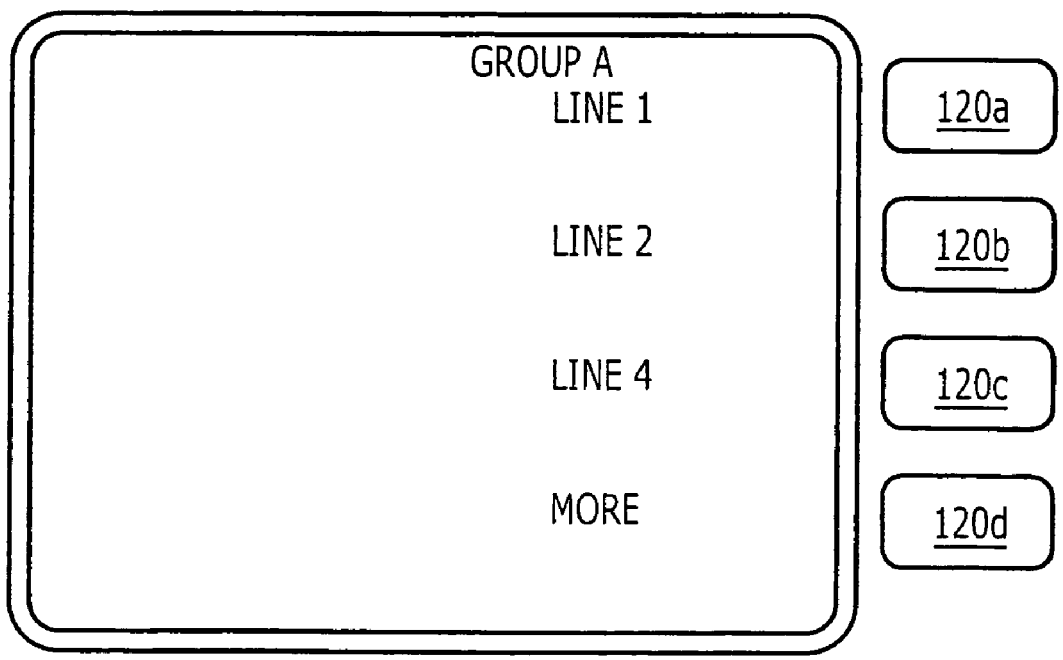
FIGS. 11A-11C are illustrations of contact profiles according to some embodiments of the invention.
Figure 11B:
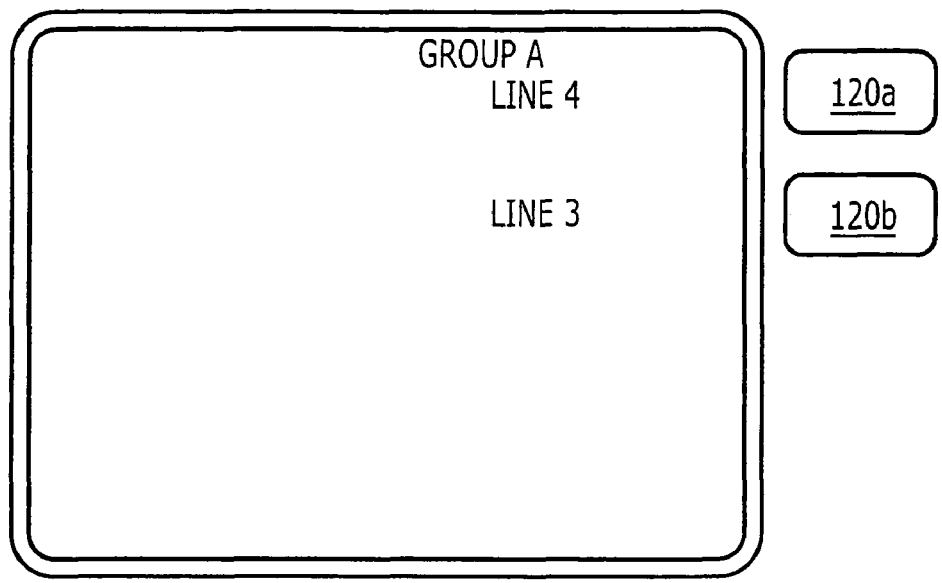
Figure 11C:
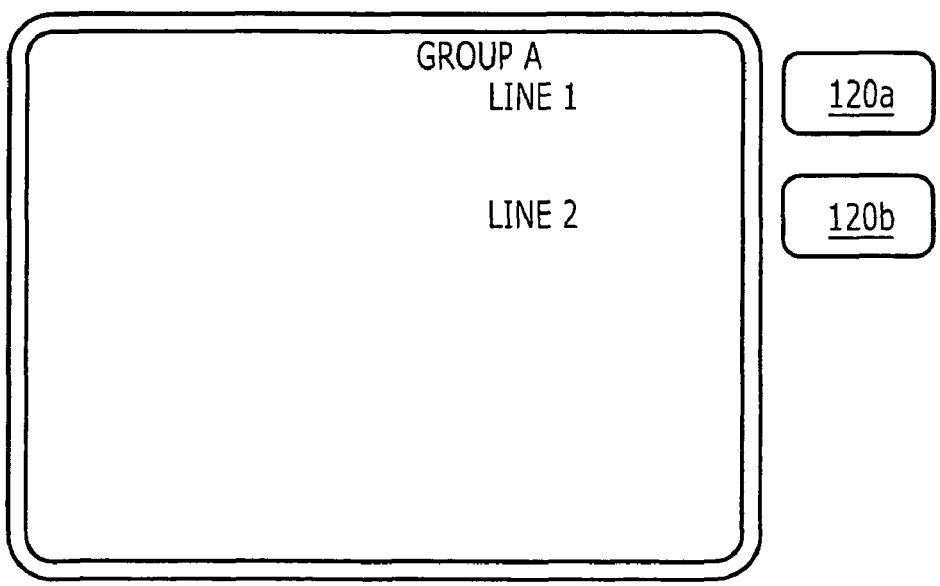

FIGS. 11A-C are schematic illustrations of information included in contact profiles according to some embodiments of the invention. In particular, FIG. 11A shows the display on the caller's VoIP phone provided with information from a contact profile according to some embodiments of the invention. According to FIG. 11A, the contact profile shows lines 1, 2 and 4 being available as secondary contacts if, for example, line 3 is unavailable. As further shown in FIG. 11A, more options may be available than may fit on the display at one time, which may be accessed by selecting "more." When a user selects one of the available secondary contacts, the call processing/routine circuit 910 routes the call to the selected secondary phone line.

It will be further understood that the available secondary contacts displayed by the calling VoIP phone line may depend on which of the phone lines is actually available at that time. For example, if it is determined that line 2 in the calling group is also unavailable, line 2 may not be provided on the display as an option. It will be further understood that the contact profile for each of the phone lines in the calling group may be the same (i.e., the same contact profile may be used for each of the phone lines in the group).

In some embodiments according to the invention, the contact profile may be different for different called phone lines. For example, as shown in FIG. 11B, a call to phone line 1 (when is unavailable) may result in phone lines 4 and 3 being offered as options for secondary contacts on the display of the caller's VoIP phone. If, for example, the subscriber associated with phone line 4 is designated as the primary backup for the phone line 1. Furthermore, phone line 3 may be offered as a less preferred option to phone line 4 if, for example, the subscriber associated with phone line 3 is the backup for phone line 4. Accordingly, in some embodiments according to the invention, the options provided to the caller's VoIP phone as part of the contact profile may be based on the relationship between the members of the calling group that are available.

According to FIG. 11C, the options for secondary contact provided on the display of the caller's VoIP phone may be based on the calling group of which the caller VoIP phone line is a member and based on the function associated with the lines in the calling group. For example, if a call is made from a member of a sales calling group, the information from the contact profile provided to the display of the caller's VoIP phone may be organized according to which members of the calling group are designated as "sales support." In particular, the subscriber associated with phone line 1 in the calling group may be the primary sales support person within the group, whereas the subscriber associated with phone line 2 is designated as the backup to the primary sales support person. It will be further understood that the subscriber associated with phone line 2 may be the primary support person for calls received from other calling groups. Accordingly, the contact profile information provided to the calling VoIP phone line may be based on the calling group in which the calling party is a member.

Figure 12:
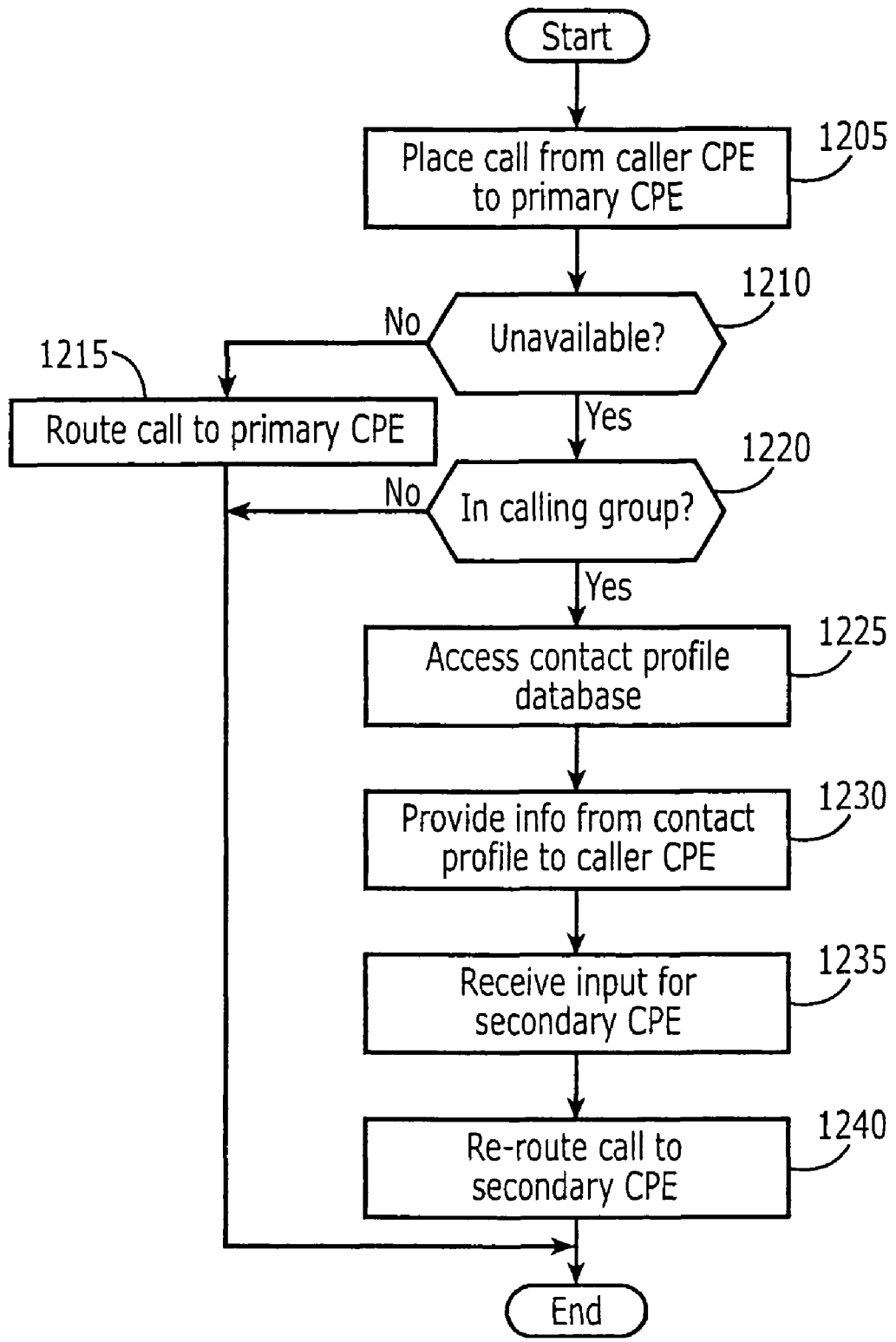
FIG. 12 is a flowchart that illustrates operations of a call processing/routine system according to some embodiments of the invention.

FIG. 12 is a flowchart that illustrates operations of a call processing/routing system according to some embodiments of the invention. According to FIG. 12, a call is placed from a caller VoIP phone line to a primary VoIP phone line (block 1205). If the primary VoIP phone line is available (block 1210), the call is routed to the primary VoIP phone line (block 1215). If, however, the primary VoIP phone line is unavailable (block 1210), the call processing system determines whether the primary VoIP phone line is included in a calling group by accessing a subscriber database (block 1220).

If the primary VoIP phone line is not included in a calling group (block 1220), call processing can be terminated. If, however, the primary VoIP phone line is in a calling group (block 1220), the system accesses a contact profile associated with the primary VoIP phone line (block 1225). The information included in the contact profile is provided to the caller VoIP phone line for display (block 1230) on the caller's VoIP phone. Input is provided via the caller VoIP phone line to select a secondary VoIP phone line to which the call is to be re-routed in response to the unavailability of the primary VoIP phone line (block 1235). The input is provided to the system, which re-routes the call from the caller VoIP phone line to the selected secondary VoIP phone line (block 1240).

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method of providing voice over internet protocol communications comprising:
   allowing a third phone line included in a calling group of a plurality of voice over internet protocol phone lines to connect to an in-progress call between two of the phone lines included in the calling group, wherein the allowing comprises:
      providing in-progress call status information to remaining phone lines included in the calling group;
      receiving a request to join the in-progress call from the third phone line;
      bridging the third phone line to the in-progress call; and
      allowing the third phone line to connect to the in-progress call based on security information associated with the in-progress call; and
   suppressing status information of bridging the third phone line to the in-progress call to avoid display thereof based on privilege information associated with the third phone line.

2. The method according to claim 1 wherein the receiving a request comprises receiving the request to join as a monitor so that no audio information is provided from the third phone line to the in-progress call.

3. The method according to claim 1 further comprising:
   providing status information of bridging to the in-progress call for display.

4. The method according to claim 1 further comprising:
   allowing the third phone line bridged to the call in-progress to disconnect therefrom while allowing the in-progress call to continue.

5. The method according to claim 1 wherein the allowing further comprises:
   allowing the third phone line to connect to the in-progress call based on privilege information associated with the third phone line.

6. The method according to claim 1 wherein the allowing further comprises:
   allowing the third phone line to connect to the in-progress call based on input by one of the two phone lines included in the in-progress call.

7. The method according to claim 6 wherein the input comprises an acceptance or a denial.

8. The method according to claim 1 wherein the third phone line requesting to join the in-progress call and the two phone lines conducting the in-progress call are at separate customer premises.

9. The method according to claim 1 wherein the allowing further comprises:
   providing the in-progress call status information associated with the in-progress call between a first phone line of the two phone lines at a first customer premises and a second phone line of the two phone lines at a second customer premises to the third phone line at a third customer premises;
   providing the request to join the in-progress call to one of the two phone lines;
   allowing input from the one phone line for determining whether the third phone line will be bridged to the in-progress call;
   bridging the third phone line to the in-progress call if the input from the one phone line allows the third phone line to connect to the in-progress call; and
   denying the request to join the in-progress call if the input from the one phone line denies permission to the third phone line to connect to the in-progress call.

10. A computer readable program product for providing voice over internet protocol communications comprising a non-transitory computer readable medium having computer readable program code embodied therein, the computer readable program product comprising:
    computer readable program code configured to allow a third phone line included in a calling group of a plurality of voice over internet protocol phone lines to connect to an in-progress call between two of the phone lines included in the calling group, wherein the computer readable program code configured to allow comprises:
       computer readable program code configured to provide in-progress call status information to remaining phone lines included in the calling group;
       computer readable program code configured to receive a request to join the in-progress call from the third phone line;
       computer readable program code configured to bridge the third phone line to the in-progress call; and
       computer readable program code configured to allow the third phone line to connect to the in-progress call based on security information associated with the in-progress call; and
    computer readable program code configured to suppress status information of bridging the third phone line to the in-progress call to avoid display thereof based on privilege information associated with the third phone line.

11. The computer readable program product according to claim 10 wherein the computer readable program code configured to receive a request comprises computer readable program code configured to receive the request to join as a monitor so that no audio information is provided from the third phone line to the in-progress call.

12. The computer readable program product according to claim 10 further comprising:
    computer readable program code configured to provide status information of bridging to the in-progress call for display.

13. The computer readable program product according to claim 10 further comprising:
    computer readable program code configured to allow the third phone line bridged to the call in-progress to disconnect therefrom while allowing the in-progress call to continue.

14. The computer readable program product according to claim 10 wherein the computer readable program code configured to allow further comprises:
    computer readable program code configured to allow the third phone line to connect to the in-progress call based on privilege information associated with the third phone line.

* * * * *